June 8, 1965 F. F. OHNTRUP 3,187,606
FABRICATING TOOL AND TECHNIQUE
Filed June 5, 1961 2 Sheets-Sheet 1

INVENTOR.
FREDERICK F. OHNTRUP
BY
Carl Fissell Jr.
AGENT

June 8, 1965   F. F. OHNTRUP   3,187,606
FABRICATING TOOL AND TECHNIQUE
Filed June 5, 1961   2 Sheets-Sheet 2

INVENTOR.
FREDERICK F. OHNTRUP
BY
*Carl Fissell Jr.*
AGENT

United States Patent Office 3,187,606
Patented June 8, 1965

3,187,606
FABRICATING TOOL AND TECHNIQUE
Frederick F. Ohntrup, Plymouth Meeting, Pa., assignor to Burroughs Corporation, Detroit, Mich., a corporation of Michigan
Filed June 5, 1961, Ser. No. 114,956
5 Claims. (Cl. 76—107)

The present application relates to fabricating tools and techniques, and, more particularly, although not necessarily exclusively, to the method of fabricating tools useful in making objects of various configurations such for example, as other tools. Another and important aspect of the present invention has to do with providing a tool which is useful in producing sub-miniature semi-conductor assemblies of consistent similarity and substantial identity one with another. With even more particularity, the present invention relates to an electroformed tool which may be used with ultrasonic type apparatus in the making of other similar types of tools or miniature diode arrays for use in diode matrices or transistor assemblies.

In industry generally, and in the electronic industry more particularly associated with computation apparatus, it is desirable to be able to produce extremely small sub-miniature components of substantially identical size and shape and/or uniform construction. At the present time with known techniques, the tools prepared for such production must be specially made and generally have a relatively short useful life. For example, where it is desired to produce a sub-miniature array of semi-conductor elements such as diodes, it has been necessary in the past to construct the fabricating tools by hand. The results are generally not completely satisfactory due to the cost, the time consumed and the fact that consistent uniformity is difficult to maintain.

In air-borne computation gear, the space that is available to house equipment for performing many of the involved electronic functions is extremely limited. A diode matrix having more than one thousand diodes, of the conventional type used in such a computer, would occupy considerable space. The problems simply in soldering and/or connecting such individual components together and to the associated circuitry becomes one of considerable magnitude. It has been suggested to form such diode arrays out of individual elements or pieces of semi-conductive material, such, for example, as silicon, and thereafter produce a plurality of uniformly sized silicon diodes by machining a body of silicon of the desired thickness, say 15 mils, into desired configuration and diffuse impurities in each side, forming a juncture at one side. It is possible, of course, to have a number of junctions such as are employed with, for example, a transistor. Where it is necessary or desired to interconnect the various diodes or transistor elements together, it is not only difficult, due to the small size of the components, but extremely tedious and requires excessive amounts of time and hand labor, making such fabrication costly and inefficient.

It is an important object of the present invention, therefore, to solve the foregoing problems in a novel and unusual manner by providing a simple and inexpensive tool useful in fabricating other similar tools.

Another important object of the invention is to provide means for fabricating multitudinous, consistently similar, or substantially identical individual structural elements.

Still another important object of the present invention is the technique of fabricating an electroformed tool which is useful in various machining processes.

Another object of the present invention is to provide an electroformed ultrasonic machine tool which can be used in making other similar tools cheaply and efficiently.

Another object of the invention is to provide a tool of the character aforementioned which will be of novel and improved construction.

The invention in accordance with the foregoing objects and first briefly described herein, comprises the steps of forming an impression of a desired resultant structure, casting the impression in a supporting material, providing a rigid replica or image of the cast impression and thereafter ultrasonically machining the image into a suitable solid such as a semi-conductor material, thus to produce an exact replica of the original impression.

It is understood that the disclosure herein is merely illustrative and intended in no way to, in a limiting sense, change the details of construction, rearrangement of parts being permissible as long as within the spirit of invention or the scope of the claims which follow, wherein the accompanying drawings form a part of the specification and include:

FIG. 1 which is an isometric view of a planar refractory photo-sensitized plate for use with the present invention;

Figure 1:
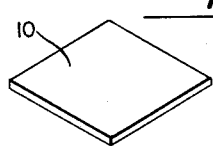
Figure 6:
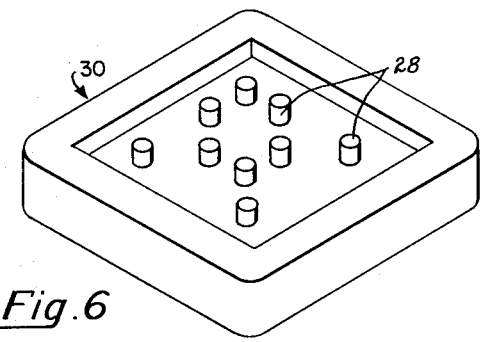
FIG. 6 is an isometric view of the casting produced by means illustrated in FIG. 5.
Figure 2:
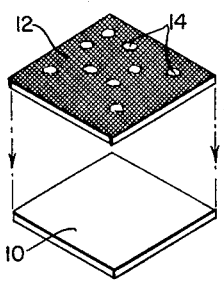
FIG. 2 is an exploded isometric view of the plate of FIG. 1 together with an image forming negative used therewith to provide an image on the photo-sensitized plate of FIG. 1.
Figure 7:
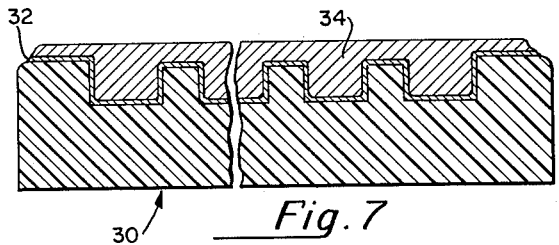
FIG. 7 is a sectional view of the product of FIG. 6 after electroforming.
Figure 3:
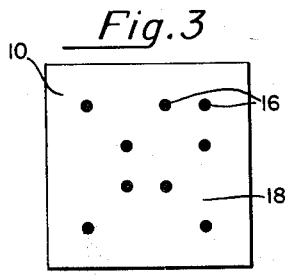
FIG. 3 is a plan view of the exposed plate.

Referring now to FIGS. 1 through 8 inclusive, which will be discussed simultaneously, and wherein similar reference characters refer to similar elements of the structure, there is provided a thin slab or plate of photosensitized glass 10. The glass which has been found most suitable is essentially a lithium silicate, modified by potassium oxide and aluminum oxide and containing traces of cerium and silver compounds as photosensitive ingredients. A typical weight percent composition follows: $SiO_2$, 81.5; $Li_2O$, 12.0; $K_2O$, 3.5; $Al_2O_3$, 3.0; $CeO_2$, 0.03; Ag, 0.02. Physical properties of this glass are given in the table below.

*Physical properties*

| | |
|---|---|
| Softening point [a] | °C 637 |
| Annealing point [a] | °C 458 |
| Stain point [a] | °C 430 |
| Coefficient of expansion | $86.1 \times 10^{-7}$ |
| Refractive index | 1.5133 |
| Density | 2.3356 |
| Electrical resistivity (log R, ohm-cm. at 25° C.) | 11.4 |

[a] Measured by Littleton's method (3, 4)
 (3) Littleton, J. T., Jr., J. Am. Optical Sec. 10 (4), 250 (1927)
 (4) Littleton, J. T., Jr., J. Am. Optical Sec. 4 (4), 224 (1920)

This is a product of the Corning Glass Company, Corning, N.Y. A film or other similar image bearing negative material 12 is provided by photographic or other similar processes, with a negative image of a desired pattern 14, e.g., semi-conductor array. The negative 12 and the photosensitized plate 10 are then brought together in contact printing relationship, as indicated by the arrows in FIG. 2, after which they are exposed to ultraviolet light. A photo-chemical reaction takes place at the points 16 on the glass which are exposed to the ultraviolet light, such that these exposed areas, after heat treatment and further processing, are made more etchable with hydrofluoric acid, that is, these areas will etch more rapidly than the boundary or surrounding areas 18 of the glass. It is desirable that there be a greater degree of etching accomplished in the vertical direction than in the horizontal direction, thereby to avoid the so called "undercutting" which is usually observed with ordinary etching techniques. In the present method, the employment of the glass described above permits the etching material to etch downwardly and outwardly at a ratio of approximately 15 to 1. In other words, the etching material removes fifteen increments of depth for each increment of width thereby reducing the undercutting to a negligible amount. Selectively etchable glass is described in Patent Number 2,628,160 to Stanley D. Stookey, assigned to the Corning Glass Work, Corning, N.Y. It is thus possible by this technique to etch intricate patterns into the glass 10 while maintaining etchant ratios of approximately 15 to 1. The composition of the acid bath and the temperature of etching used to obtain such a ratio with the glass specified above, can be those which are set out in said patent to Stookey. The glass in this manner is provided with, for example, etched circular holes 20 which extend completely through the glass and are of relatively constant and uniform diameter throughout their extent.

The etched plate 22 is next placed in a shallow container 24 into which a quantity of liquid plastic material 26, such, for example, as polyvinylchloride, is decanted from a vessel, not shown, so as to fill the container 24 to a level completely covering the glass plate 10. The material is flowed over and around the glass plate in a manner so as to cause the material 26 to extend into and through the tiny holes in the glass. The plastic material is then suitably cured, as by oven curing, until it becomes a substantially solid though slightly flexible mass, after which it is removed as by being "popped" by hand out of the container 24. In this manner there is formed a reverse or positive image of the glass plate. Where there were holes in the glass plate, there are now small pillars 28 of plastic projecting a distance equivalent to the thickness of the glass plate above the plane of the plate 22. Although the plastic body is slightly flexible as before mentioned, and is thus slightly deformable, to the touch, still it maintains its dimensional stability. The flexible and cured body of plastic 30 is now dusted, sprayed, painted or otherwise provided with a surface coating 32, FIG. 7, of a conductive material such, for example, as graphite or a suitable sensitizer.

Figure 8:
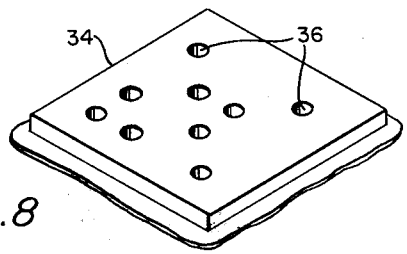
FIG. 8 is an isometric view of an electroformed tool according to the invention.
Figure 4:
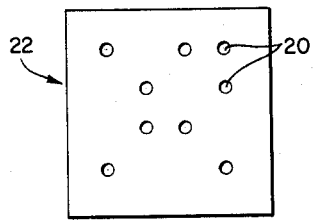
FIG. 4 is a plan view of the plate after etching.
Figure 9:
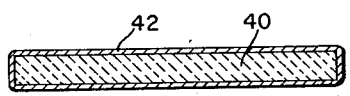
FIG. 9 is a sectional view of a nickeled semi-conductor wafer.
Figure 10:
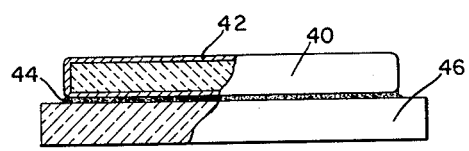
FIG. 10 is an end view, partially in section, of the member of FIG. 9 secured to a refractory substrate or supporting member for further processing.
Figure 5:
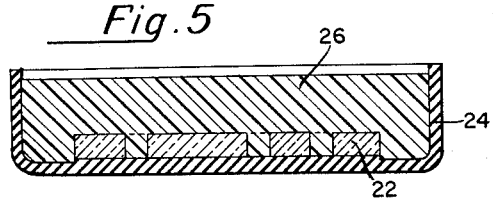
FIG. 5 is a sectional view of the etched plate of FIG. 4 disposed in plastic molding material.

The conductively coated member 30 is next provided with an electroformed coating or layer of substantially pure nickel 34 which may be electroplated onto the conductive surface to a controlled depth, for example, from approximately $\frac{1}{32}$ to $\frac{1}{16}$ of an inch, thus to form a solid body of nickel having the outline configuration, FIG. 8, in reverse, of the shape and outline of the plastic body 30. In this instance, the resulting body 34 of nickel includes depressions 36 where there were projections 28 on the plastic 30. In this manner the electroformed member 34 now becomes the metal image or replica of the etched glass plate 10. The metal formed image 34 is next cut and trimmed to a uniform outline for further utilization, as will now be described.

The method or technique of the present invention can be employed to produce a variety of fabricating tools for use in industry. One such fabricating tool is that which is set forth hereinabove with reference to the preferred embodiment of the present invention. Such a tool is useful in making semi-conductor arrays which may be employed in electrical circuit matrices such, for example, as a diode matrix or array used in electronic computing equipment or as a translating device. To this end, therefore, the illustrated and preferred embodiment of the present invention shows a member 40 of semi-conductor material such, for example, as silicon, which may take the form of an elongated bar, a flat relatively thin disc or wafer, or any other desired configuration. The silicon bar 40 is first plated on both sides and all edges with a layer of nickel 42. The nickel plating is bonded very thoroughly to the silicon member through a sintering process after which the member 40 is adhesively bonded as by a low melting point wax or cement 44 to a substrate supporting member 46 which may be Pyrex #7740 glass or other similar material.

Figure 11:
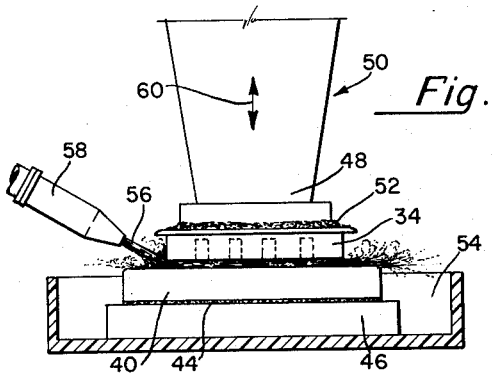
FIG. 11 is an elevational view, partially in section, of a portion of an ultrasonic machine used with the present invention.
Figure 16:
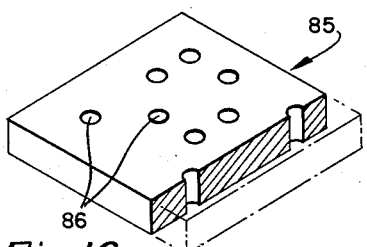
FIG. 16 is an isometric view partially in section of another tool construction technique employed in the present invention.
Figure 13:
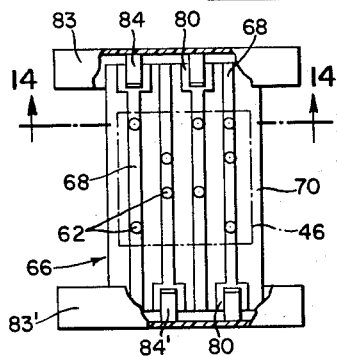
FIG. 13 is a plan view of a printed wiring assembly in registry with a semi-conductor assembly of FIG. 12.
Figure 18:
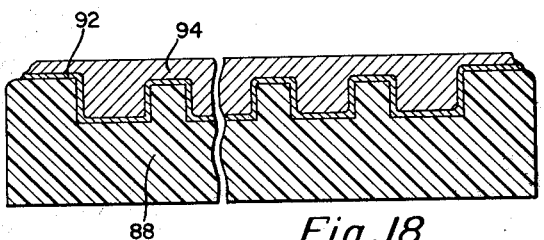
FIG. 18 is a view similar to FIG. 8 but showing the apparatus formed using the second technique; and, FIG. 19 is a sectional view of the tool formed by the process as described in connection with FIGS. 16, 17 and 18.
Figure 14:
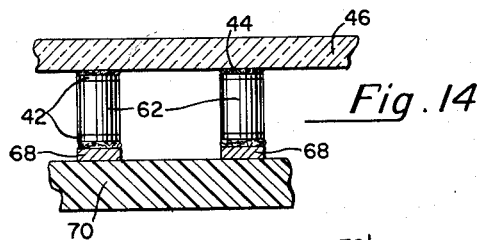
FIG. 14 is a view along the line 14—14 of FIG. 13.
Figure 19:
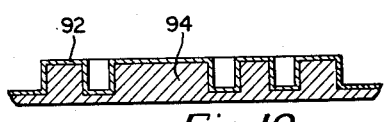

In order to form, cut, machine, or otherwise shape relatively hard silicon nickel plated material, the electroformed tool 34, earlier referred to herein, is attached to the tool holding end 48 of an ultrasonic transducer 50, such as that which is shown in FIG. 11, as by brazing 52, welding or soft soldering. The silicon bonded to glass assembly of FIG. 13 is then disposed in a shallow dish, receptacle or container 54 and oriented directly beneath the tool head of the ultrasonic machine 50. The tool head is then lowered to bring the tool 34 into surface contact with the nickel coated silicon material 40 and an abrasive slurry 56 of boron carbide or other similar abrasive, of a desired grit size, is forced under slight pressure from a nozzle 58 onto the surface of the silicon while the tool of the ultrasonic machine 50 is maintained against the surface of the silicon 40. The ultrasonic machining process causes the tool to be energized producing an ultrasonic motion, double headed arrows 60, at approximately 20,000 cycles per second, and at a very small displacement, sufficient to accelerate the boron carbide abrasive into the silicon 40 and machine away portions of the silicon leaving the impression of the tool in the body of silicon. Dimensional control of the size of the resulting configuration is a matter of how fine the grit is that is used. The finer the grit is, of course, the better control, but the general dimensions and tolerances for the present application are not limited by the grit size.

In a relatively short time the ultrasonic machining process will produce a plurality of impressions and projections in the silicon corresponding to the configuration of the plastic mold 30 and will cut the silicon down to and very slightly into the glass substrate 46. Depending on the size of the orifices 20 in the original etched plate 22, ultrasonic machining will provide tiny pillars 62 projecting above the surface 64 of the glass substrate $\frac{40}{10,000}$ of an inch in diameter, for example. The pillars 64 are of uniform diameter throughout their length and extend upwardly from the plate for example, $\frac{1}{15,000}$ inch. In this manner there is provided a plurality of silicon diodes ten mils in diameter and 15 mils high. The tolerances are uniform throughout and the resulting diodes 62 are identical images of the original pillars 28 of the member 30 and conform exactly thereto.

As a means of providing one form of utilization device, e.g., a matrix array of silicon diodes, a printed wiring circuit plate 66 of FIG. 13 may be employed and which may be made in any suitable fashion such, for example, as by a silk screen process, wherein conductive busses 68 are screened onto a dielectric support 70, such as glass, and thereafter the busses 68 are electroplated with copper and then solder plated. In the manner and by means similar to that set forth in the copending application filed concurrently herewith in the name of Ralph Saunders, entitled, "A Method of Fabricating Sub-Miniature Semi-Conductor Matrix Apparatus," filed June 5, 1961, Serial No. 124,258, this glass circuit plate 70 is now mounted to the diode assembly. The surface of the circuit plate is provided with a flux, as is the surface of each of the diodes 62 after which the busses 68 of the circuit plate 70 are brought into registering contact with the diodes 62 as seen in FIG. 13. The assembly is then heated so as to melt the solder and bond the circuit busses to the diodes, while maintaining the rear surface of the diodes still bonded to the glass supporting subrate 46. Thereafter the resulting soldered assembly is placed in a solvent bath so as to dissolve away the bonding agent 44 between the glass substrate 46 and the diodes 62, thus to remove the substrate leaving the diodes firmly soldered to their respective conductors 68 on the glass circuit plate 70.

Figure 15:
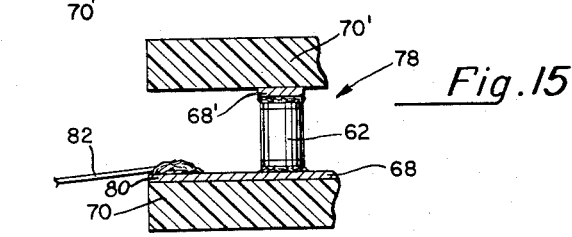
FIG. 15 is an elevational sectional view of a semi-conductor matrix formed by the invention.

The foregoing operation leaves the circuit plate 70 with a number of diodes 68 soldered thereon and in contact with one side of each diode. The opposite ends of the diodes are now provided with a flux and a second similar glass circuit plate 70', processed in the manner aforementioned is brought into contact with the exposed surfaces of the diodes after which the assembly is then heated under pressure so that the diodes become soldered to the conductors 68' of the opposite circuit plate 70' producing an assembly 78 such as that shown in FIG. 15, resulting in a matrix of orthogonal conductors 68 and 68' with the diodes 62 disposed at the intersections of the various conductive lines which are running at right angles to one another. The actual resulting configuration whether a matrix or other type of construction is a matter of design choice since the present invention is useful in forming a fabricating tool for producing a wide variety of apparatus.

If it is desired or required at the stage of processing in which the electrical circuit plates 70 and 70' were fabricated, conductive pads 80 may be provided as a means for securing other electrical conductors 82 thereto so that input and output connections can thus be made to the diode matrix and the entire assembly 78 can then be packaged to provide a miniature diode matrix enabling the performance of certain logic functions.

Figure 12:
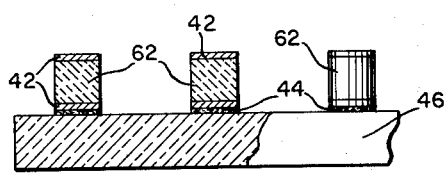
FIG. 12 is a sectional view of FIG. 10 after ultrasonic machining.
Figure 17:
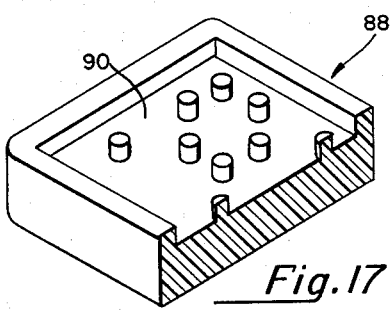
FIG. 17 is an isometric view similar to FIG. 6 partially in section of a casting formed from the device of FIG. 16.

An ultrasonic machining tool may also be provided by the technique of first producing a metal master 85 which is drilled, machined, or otherwise provided with a series of apertures 86 therethrough of uniform dimension consistent with a pattern desired to be employed with the final matrix, The thus formed tool 85 is thereafter cast in polyvinylchloride material 88 or other similar plastic to produce a reverse image 90 thereof. In the manner earlier referred to, the plastic replica is provided with a conductive surface coating 92 after which the conductive coating is electroplated, as before, to provide a solid body 94 of nickel. The replica thus formed is a reverse image of the polyvinylchloride member 88 and is an exact replica of the original tool 85. The nickel tool 94 may then be employed with the ultrasonic machine 50 for cutting other similar tools and/or preparing the semiconductor arrays of FIG. 12. It should be readily apparent from the foregoing that the last mentioned steps obviate the need for utilizing the photosensitized glass original earlier mentioned herein, and may thus provide a relatively inexpensive method and means for duplicating a wide variety of structural configurations to use as fabricating tools or to produce a wide variety of end products.

If desired, printed wiring connectors or receptacles 83–83' including connectors 84–84' may be employed for detachably pluggably engaging the circuit plates 70–70' in a know manner, for interconnection to other associated circuitry or circuit components.

What is claimed is:

1. The method of making an object useful as a fabricating tool for fabricating an array of individual subminiature semi-conductor electrical circuit components comprising the steps of:
   (a) providing an etchable photo-sensitized refractory body of a material that is capable of being etched at the rate of 15 increments of depth for each increment of width,
   (b) exposing said photo-sensitized body to ultraviolet light in a pattern substantially identical to an original object to be duplicated,
   (c) etching away the exposed portions of said photo-sensitized body at an etchant ratio of 15 to 1 thereby to avoid undesirable undercutting,
   (d) casting said etched body in molding material to thereby provide a reverse image of said body in said material,
   (e) removing the cast reverse image from the mold,
   (f) coating the cast image with an electrically conductive material and thereafter,
   (g) electroplating said coated casting with metal thereby to from a rigid replica of said negative pattern image.

2. The method of making an object useful as a fabricating tool for fabricating an array of individual subminiature semi-conductor electrical circuit components comprising the steps of:
   (a) providing an etchable photo-sensitized refractory body having an etchant ratio of approximately 15 to 1,
   (b) exposing said photo-sensitized body to ultraviolet light in a pattern substantially identical to an original object to be duplicated,
   (c) etching away the exposed portions of said photo-sensitized body,
   (d) casting said etched body in molding material to thereby provide a reverse image of said body in said material,
   (e) removing the cast reverse image from the mold,
   (f) coating the cast image with an electrically conductive material, and
   (g) electro-forming a metal coating on said coated casting thereby to form a rigid replica of said negative pattern image.

3. The method of making an object useful as a fabricating tool for fabricating an array of highly uniform individual sub-miniature semi-conductor electrical current components comprising the steps of:
   (a) providing an etchable photo-sensitized body having an etchant ratio of approximately 15 to 1 when exposed to ultraviolet light,
   (b) exposing said photo-sensitized body to ultraviolet light in a pattern substantially identical to an original object to be duplicated,
   (c) etching away the exposed portions of said photo-sensitized body to produce one or more reverse images of relatively uniform diameter and depth,
   (d) casting said etched body in molding material to thereby provide a positive image of said body in said material,
   (e) removing the cast positive image from the casting,
   (f) coating the cast image with an electrically conductive material, and
   (g) electroplating said coated casting with metal thereby to form a rigid replica of said pattern image.

4. The method of making an object useful as a fabricating tool for fabricating an array of individual, subminiature semi-conductor electrical circuit components comprising the steps of:
  (a) providing a photo-sensitized glass member,
  (b) providing a film or other similar image-bearing negative,
  (c) bringing the film and the photo-sensitized member together in contact printing relationship,
  (d) exposing the photo-sensitized glass member to ultraviolet light whereby said glass is capable of being etched at ratios of at least 15 to 1,
  (e) etching said photo-sensitized member,
  (f) casting the etched member in viscous molding material to thereby provide a reverse image of said member in said molding material,
  (g) curing said casting so that it is substantially solid though slightly flexible,
  (h) removing the cast-reverse image from the mold,
  (i) coating the surface of said casting with a conductive material, and
  (j) electroplating onto said conductive material to a controlled depth, a coating of a solid body of dense metalic material to provide a rigid negative replica of said original image.

5. The method of making an object useful as a fabricating tool for fabricating an array of individual subminiature semi-conductor electrical circuit components comprising the steps of:
  (a) providing an etchable photo-sensitized refractory body,
  (b) exposing said photo-sensitized body to ultraviolet light in a pattern substantially identical to an original object to be duplicated so that said body is etchable at a ratio of approximately 15 to 1,
  (c) etching away the exposed portions of said photo-sensitized body,
  (d) casting said etched body in molding material thereby to provide a reverse image of said body in said material,
  (e) removing the cast reverse image from the mold,
  (f) coating the cast image with an electrically conductive material, and
  (g) electroplating said coated casting with metal thereby to form a rigid replica of said negative pattern image.

References Cited by the Examiner

UNITED STATES PATENTS

| | | |
|---|---|---|
| 2,182,775 | 12/39 | Aboubhar. |
| 2,580,716 | 1/52 | Balamuth. |
| 2,743,629 | 5/56 | Pellegrimo et al. _____ 76—107 |
| 2,930,107 | 3/60 | Martin. |
| 2,989,669 | 6/61 | Lathrop _____ 317—234 |
| 2,994,121 | 8/61 | Shockley _____ 29—25.3 |
| 3,040,213 | 6/62 | Byer. |
| 3,061,739 | 10/62 | Stone _____ 29—25.3 X |

WHITMORE A. WILTZ, *Primary Examiner.*

FRANK H. BRONAUGH, RICHARD H. EANES, Jr.,
*Examiners.*